US008782071B1

(12) United States Patent
Mukherjee et al.

(10) Patent No.: US 8,782,071 B1
(45) Date of Patent: Jul. 15, 2014

(54) FRESH RELATED SEARCH SUGGESTIONS

(71) Applicant: Google Inc., Mountain View, CA (US)

(72) Inventors: Rajat Mukherjee, San Jose, CA (US); Abhinandan S. Das, Sunnyvale, CA (US); Adam Westall, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/842,677

(22) Filed: Mar. 15, 2013

Related U.S. Application Data

(63) Continuation of application No. 12/483,992, filed on Jun. 12, 2009, now Pat. No. 8,412,699.

(51) Int. Cl.
*G06F 7/00* (2006.01)
*G06F 17/30* (2006.01)

(52) U.S. Cl.
USPC ........... 707/759; 707/765; 707/766; 707/767; 707/768

(58) Field of Classification Search
USPC ......... 707/705, 713, 721, 759, 765, 766, 767, 707/768, 999.3
See application file for complete search history.

(56) References Cited

U.S. PATENT DOCUMENTS

| 7,599,928 | B2 | 10/2009 | Smyth et al. |
| 7,680,772 | B2 | 3/2010 | Kronberg |
| 7,739,274 | B2 | 6/2010 | Curtis et al. |
| 7,827,170 | B1 | 11/2010 | Horling et al. |
| 7,949,647 | B2 * | 5/2011 | Teran et al. .................... 707/708 |
| 8,010,523 | B2 | 8/2011 | Djabarov |
| 2006/0064411 | A1 | 3/2006 | Gross et al. |
| 2006/0167842 | A1 | 7/2006 | Watson |
| 2007/0192293 | A1 | 8/2007 | Swen |
| 2007/0226082 | A1 | 9/2007 | Leal |
| 2008/0109422 | A1 | 5/2008 | Dedhia |
| 2009/0265328 | A1 | 10/2009 | Parekh et al. |
| 2009/0299991 | A1 | 12/2009 | Zarzar Charur et al. |
| 2010/0082604 | A1 | 4/2010 | Gutt et al. |
| 2010/0138436 | A1 | 6/2010 | Gupta et al. |
| 2011/0010362 | A1 * | 1/2011 | Kim ............................. 707/722 |
| 2011/0035397 | A1 | 2/2011 | Joshi et al. |

* cited by examiner

*Primary Examiner* — Hares Jami

(74) *Attorney, Agent, or Firm* — Fish & Richardson P.C.

(57) ABSTRACT

Methods, systems, apparatus, including computer program products, for providing fresh related search suggestions in response to a user submitted query are presented. In one implementation, a plurality of prior queries are selected wherein each of the prior queries was submitted as a search query a number of times during a recent time period and satisfies a criterion. For each of the prior queries, the prior is selected as a candidate query based on one or more of: a determination that search results responsive to the prior query include a number of news results that satisfy a second threshold, and relevance data indicative of user behavior relative to the search results responsive to the prior query. In response to receiving a user query, one or more candidate queries are selected that match the user query.

18 Claims, 5 Drawing Sheets

FRESH RELATED SEARCH SUGGESTIONS

CROSS-REFERENCE TO RELATED APPLICATIONS

This application is a continuation application of, and claims priority to, U.S. patent application Ser. No. 12/483,992, for Fresh Related Search Suggestions, which was filed on Jun. 12, 2009. The disclosure of the foregoing application is incorporated here by reference.

TECHNICAL FIELD

The present disclosure relates to providing related search query suggestions.

BACKGROUND

An Internet search engine is typically designed to search for information on the World Wide Web. Users submit search queries to the search engine and the search engine identifies and presents a list of documents in response to each search query. The list of documents consists of web pages, images, sounds, and other types of files, typically identified and retrievable by their uniform resource locators (URLs). The list of documents is typically ranked according to various relevance and quality parameters before being presented to the user.

SUMMARY

In general, one aspect of the subject matter described in this specification is embodied in a method that includes selecting a plurality of prior queries wherein each of the prior queries was submitted as a search query a number of times during a recent time period and satisfies a criterion; for each of the prior queries, selecting the prior query as a candidate query based on one or more of: a determination that search results responsive to the prior query include a number of news results that satisfy a second threshold, and relevance data indicative of user behavior relative to the search results responsive to the prior query; and in response to receiving a user query, selecting from the candidate queries one or more queries that match the user query. Other implementations of this aspect include corresponding systems, apparatus, and computer program products.

These and other implementations can optionally include one or more of the following features. One or more of the matched queries can be ranked based on number of news results included in search results responsive to the matched query and relevance data indicative of user behavior relative to the search results responsive to the matched query. The ranked matched queries can be provided as related search suggestions for the user query. The recent time period is a most recent week, a most recent number of days, a most recent number of hours or a most recent number of minutes. The sufficient number of news results is determined by a number of news results in the search results responsive to the prior query over a total number the search results satisfying a criterion. The news results comprise one or more of: news articles; new blog results including information posted to micro blogs, mini blogs, and book-marking sites; new image results; new video results; and new web pages.

Relevance data indicative of user behavior can be one or more of a click-through rate on the search results responsive to the prior query and a number of clicks on the search results. Selecting from the candidate queries can include selecting as a matched query, a candidate query that is one or more of a superstring of the user query, a refinement of the user query, or is near the user query. A matched query is a refinement of the user query if a number of users first submit the user query, and at a later time refine the user query to the matched query during the recent time period. A number of users is one or more of a count of users and a fraction of users relative to a number of users who submit the user query. The criterion is a rate of change in query frequency during the time period, a deviation from an expected query frequency during the time period, or a threshold number of occurrences of the query during the time period.

Particular implementations of the described subject matter can realize one or more of the following advantages. In response to a user query for information on a specific topic, timely information is provided in the form of query suggestions that are relevant to recent events. Relevant search queries and the rate of change the number of times the query was issued by users over a recent time period are dynamically provided from various sources of information streams such as news, image, video, or blog properties (e.g., content published on the Internet). Various constraints including a minimum number of users that have submitted the relevant queries to search engines are used to ensure that the relevance of these search queries is high.

The details of one or more implementations are set forth in the accompanying drawings and the description below. Other features, aspects, and advantages will become apparent from the description, the drawings, and the claims.

DESCRIPTION OF DRAWINGS

Like reference symbols in the various drawings indicate like elements.

DETAILED DESCRIPTION

Figure 1:
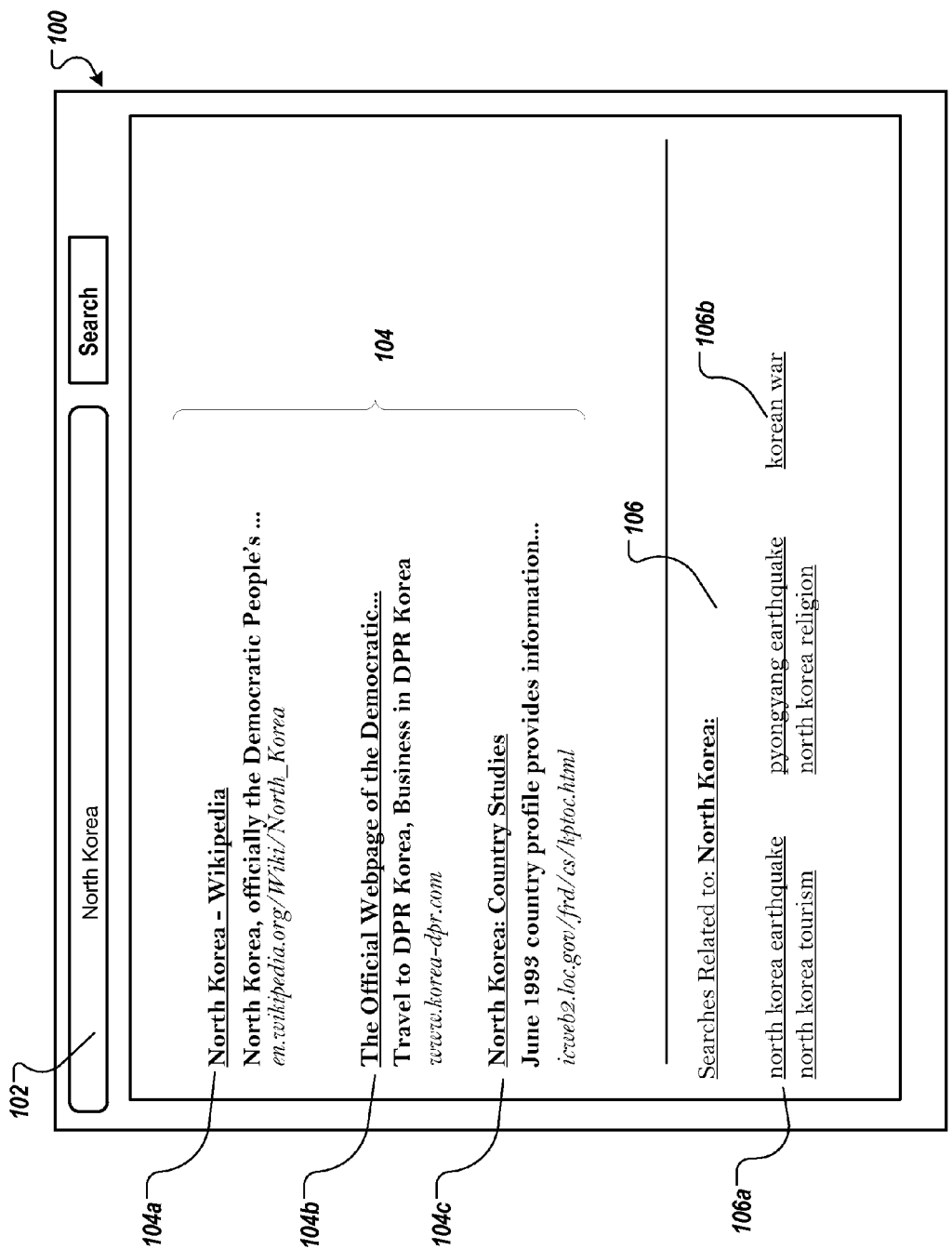
FIG. 1 illustrates an example graphical user interface for providing fresh related search queries.

FIG. 1 illustrates an example graphical user interface 100 for providing fresh related search queries. The user interface 100 includes a field 102 that allows users to enter search queries and view search results. Results responsive to queries received from a search engine are displayed in region 104 of the user interface. By way of illustration, in response to the query "North Korea", results 104 are presented. These results include a Wikipedia entry on North Korea 104a, the official home page of the Democratic People's Republic of Korea 104b, and a report from a government study on North Korea 104c. Selection of a result causes the result to be displayed in the user interface 100. In some implementations, the results are web pages.

Also presented in the user interface 100 are so-called "fresh" related search queries 106 which are timely related searches based on recent and current events. This illustration assumes that a significant earthquake recently occurred in the North Korean capital city of Pyongyang. As such, the related search queries "north korea earthquake" 106a and "pyongyang earthquake" 106b appear in the fresh related search queries 106. User selection of a fresh related search query causes the selected query to be submitted to the search engine. Results responsive to the selected fresh related search query are then presented in region 104. The fresh related search queries 106 change with the passage of time to reflect current events. So, for instance, if the same query "North Korea" 102 was submitted to the search engine a week later, the fresh related search queries could be different. Other user interfaces are possible including user interfaces which accept and present information in the form of natural language speech. Other forms of user input are possible including hand and finger gestures.

Figure 2:
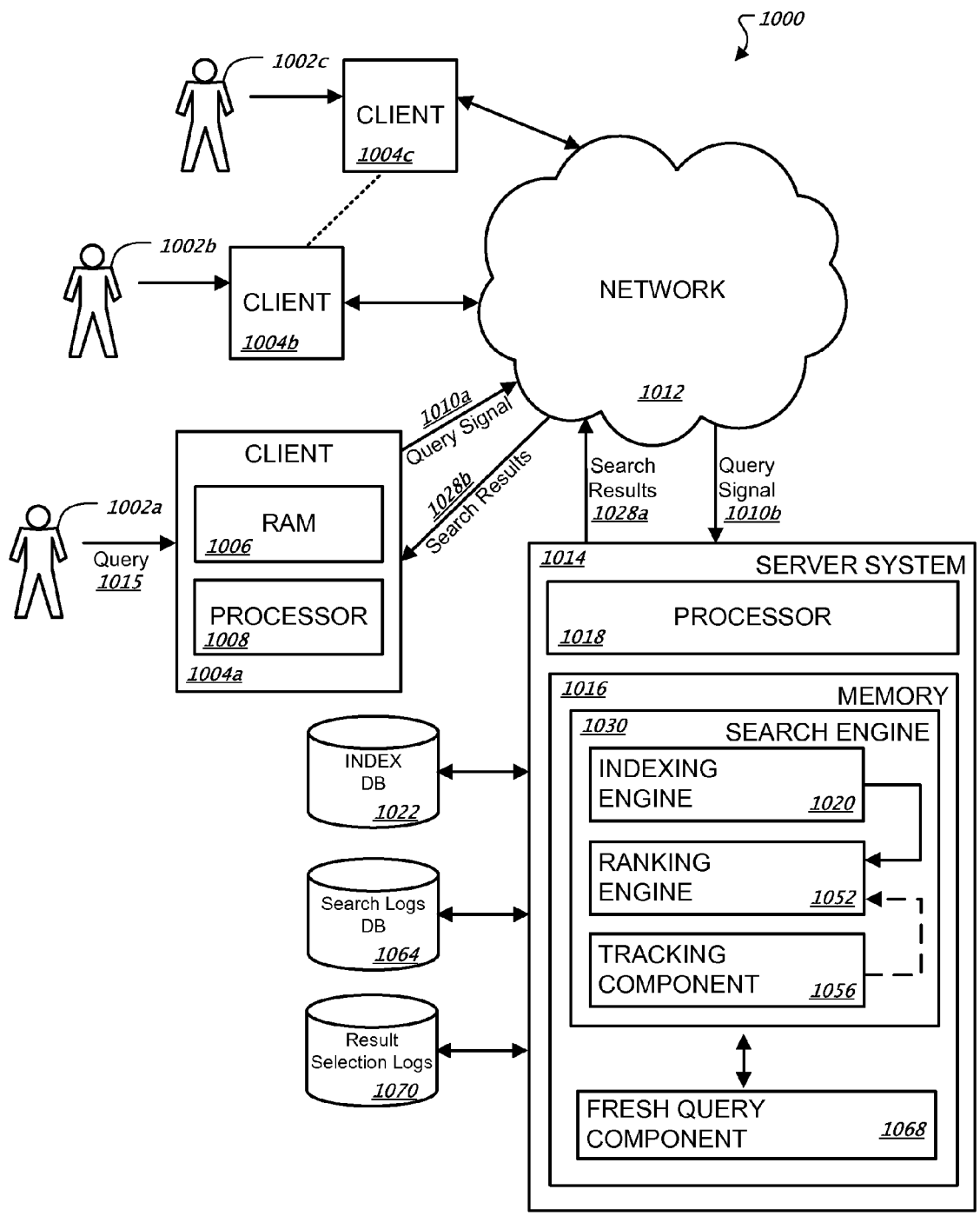
FIG. 2 is a block diagram of an example information retrieval system in which fresh related search suggestions are provided in response to a search query.

FIG. 2 is a block diagram of an example information retrieval system 1000 in which fresh related search suggestions are provided in response to search queries as can be implemented in the Internet, an intranet, or other client/server environment. Illustrated components and "engines" in FIG. 2 represent functionality that is implemented by one or more computer programs. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal or hand held device within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to the search engine 1030 within a server system 1014 to submit a query 1015. When the user 1002a submits the query 1015 through an input device attached to a client device 1004a (e.g., a keyboard, a mouse, a microphone, a camera, a motion sensor, and so on), a client-side query signal 1010a is sent into a network 1012 and is forwarded to the server system 1014 as a server-side query signal 1010b. Server system 1014 can be one or more server devices in one or more locations. A server device 1014 includes a memory device 1016, which can include the search engine 1030 loaded therein. A processor 1018 is configured to process instructions within the device 1014. These instructions implement one or more components of the search engine 1030. The processor 1018 can be a single-threaded processor or a multi-threaded processor, and can include multiple processing cores, for instance. The processor 1018 processes instructions stored in the memory 1016 related to the search engine 1030 and can send information to a client device 1004a-c, through the network 1012, to create a presentation in a user interface of the client device (e.g., a search results web page displayed in a web browser).

The server-side query signal 1010b is received by the search engine 1030. The search engine 1030 uses the information within the user query 1015 (e.g. query terms) to find relevant documents responsive to the query 1015. The search engine 1030 can include an indexing engine 1020 that searches a corpus (e.g., web pages on the Internet) to index the documents found in that corpus, and the index information for the documents in the corpus can be stored in an index database 1022. This index database 1022 can be accessed to identify documents responsive to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 1030 can include a ranking engine 1052 to rank the documents (e.g., 104a-c) responsive to the user query 1015. The ranking of the documents can be performed using traditional techniques for determining an information retrieval (IR) score for indexed documents in view of a given query. The relevance of a particular document with respect to a particular query search term or to other provided information may be determined by any appropriate technique. For example, the general level of back-links to a hypertext document that contains matches for a search term may be used to infer a document's relevance. In particular, and by way of illustration, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

A tracking component 1056 can be used to record information regarding user behavior such as individual user selections of the results presented in a ranking (e.g., 104). For example, a the user interface 100 can include embedded JavaScript code (assuming that the user interface 100 is implemented in a web browser) that communicates with the tracking component 1056 information regarding selections (e.g., mouse clicks) of individual document results (e.g., 104a) and also identifies when the user returns to the results page after viewing a result document, thus indicating the amount of time the user spent viewing the selected document result. In other implementations, the tracking component 1056 can be proxy system through which user selections of the document results are routed, or the tracking component 1056 can include pre-installed software at the client (e.g., a plug-in to the client's operating system). Other implementations are also possible, such as by using a feature of a web browser—which in some implementations is used to implement the user interface 100—that allows a tag/directive to be included in a page, which requests the browser to connect back to the server with message(s) regarding link(s) clicked by the user.

The recorded information can be stored in result selection logs 1070. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as the click-through rate (CTR) which is the percentage of users that select a document as a search result out of the total number who have the opportunity to select the document in a search result list but do not (also called "impressions").

In various implementations, the time (T), also known as "click data", can be measured as the time between the initial selection of the document result until the time the user returns to the user interface 100. In the case of video search results, the "click data" can be a measure of how long a user viewed the video or whether they viewed the video in its entirety. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques. In some implementations, the ranking engine 1052 uses information collected in the result selection logs 1070 in order to enhance the ranking of results.

A fresh query component 1068 provides fresh related queries (e.g., 106) in response to users' queries represented by signal 1010*b* for inclusion in the search results signal 1028*a* returned to the client. The fresh query component 1068 will be discussed further below with reference to FIG. 3. The search engine 1030 or another process forwards the final, ranked result list within a server-side search results signal 1028*a* along with the fresh related queries provided by the fresh query component 1068 through the network 1012. Exiting the network 1012, a client-side search results signal 1028*b* can be received by the client device 1004*a* where the results and fresh related queries can be stored within the RAM 1006 and/or used by the processor 1008 to display the results on an output device for the user 1002*a*.

Search logs 1064 are used to record search queries. The search engine 1030 or another process maintains the search logs. For example, issued image search queries can be stored in an image search log and issued news search queries can be stored in a news search log. The search logs 1064 and other information are used by the fresh query component 1068 to identify fresh related queries for inclusion in the search results signal 1028*a*.

The components shown in FIG. 2 can be combined in various manners and implemented in various system configurations. For example, the search engine 1030 and the fresh query component 1068 can be merged into a single component. In further implementations, portions of the search engine 1030 or the fresh query component 1068 can reside in the client RAM (e.g., 1006) instead of the server memory 1016. For example, the ranking engine 1052 and portions of the fresh query component can be implemented on a client such as 1004*b*. Moreover, there may be one or more intermediate servers through which query signals and search results flow between the clients 104*a-c* and the server 1014.

Figure 3:
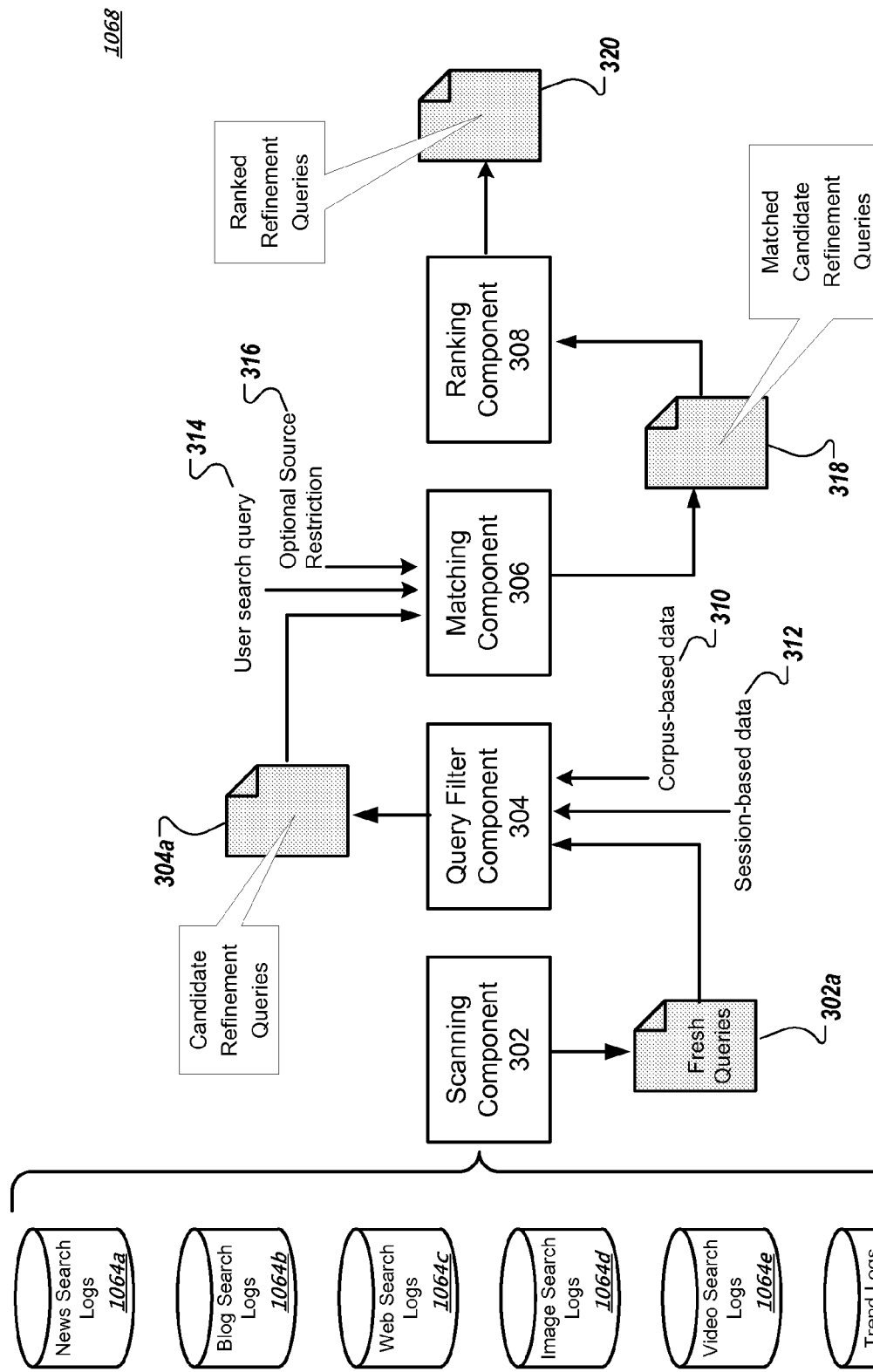
FIG. 3 illustrates an example fresh query component.

FIG. 3 illustrates an example fresh query component 1068. A scanning component 302 periodically, continually, or when triggered by an event, analyzes one or more data sources in order to identify potential "fresh" queries 302*a*. The data sources include search logs 1064*a-f*. Other data sources are possible, however, such as query feeds from other services, micro blogs (e.g., Twitter), mini blogs, book-marking sites (e.g., Digg), Google Trends, real-time services, and so on. The search logs 1064*a-e* include entries comprising a query, the time the query was submitted to the search engine 1030, and the Internet Protocol (IP) address of the client (e.g., 1004*c*) that submitted the query or a cookie value that identifies the client. By way of illustration, the news search logs 1064*a* stores searches of news sources, the blog search logs 1064*b* store searches of blogs (e.g., websites in which people can post messages and commentary), the web search logs 1064*c* store general searches of the World Wide Web, the image search logs 1064*d* store image search queries, and the video search logs 1064*e* store video search queries. The trend logs 1064*f* stores a set of queries which are currently popular or are fast becoming popular for one or more populations of users as determined by another process.

In some implementations, the scanning component 302 determines the number of times queries appear in one or more of the search logs 1064*a-f* over a recent time period (e.g., a most recent hour, day or week) as determined by timestamps associated with the queries in the search logs 1064*a-f*. If a query appears an overall number of times which exceeds a threshold value, the query is included in the fresh queries 302*a*. The threshold value, which can be increased if the query is popular, depends on the contents of the search logs 1064*a-f*. By way of illustration, the threshold value for a query that appears in the news search logs 1064*a* is 50 for a single day in the last five days, or 250 for a popular query. Other threshold values are possible. In further implementations, the scanning component 302 identifies as fresh queries 302*a* a set of queries with the most change in volume in the search logs 1064*a-f* in a recent time period as compared to a less recent time period. Generally speaking, the higher the frequency or magnitude of change, the more likely a query is to be considered "fresh".

In yet further implementations, if a query exhibits a deviation in frequency of occurrence in the search logs 1064*a-f* over a recent time period from a model of predicted frequency, and the deviation indicates that the query has become popular, the query is included in the fresh queries 302*a*. By way of illustration, the number of times a query is searched can be monitored over a given time period. Based on this monitoring, a model of predicted traffic for the query can be computed. How much the actual traffic has deviated from the model of predicted traffic can be indicative of the query's sudden popularity among a population of users. The deviation can be measured over a time period to determine whether it is above a threshold. By way of illustration, the threshold can be whether the number of times that the query was received over a single hour is three times above the standard deviation of the predicted model for that hour. Generally speaking, the greater the magnitude of deviation from expectation, the more likely a query is to be considered "fresh". In further implementations, the threshold can be determined by absolute counts (e.g., a change in the number of times the query has been issued), or as a percentage such as whether the ratio of queries in consecutive time periods is above a certain ratio, e.g., above and beyond the predicted model ratio or a predicted range.

The fresh queries 302*a* are then provided to the query filter component 304. The query filter component 304 selects from the fresh queries 302*a* candidate refinement queries 304*a*. In addition to the fresh queries 302*a* input, the query component uses one or more of session-based data 312 and corpus-based data 310. The session-based data 312 that can be considered for a given fresh query comprises the CTR of search results for the fresh query, a number of search result selections for the fresh query, and a number of users who refine a query to the fresh query. The query filter component 304 can use one or more of the session-based data 312 for selecting fresh queries 302*a*.

The CTR of search results for the fresh query is the aggregate CTR of all search results, or a subset of search results, for the fresh query in a given time period. In some implementations, the CTR for search results of a fresh query can be set to a minimum tunable threshold (e.g., 30%) that, if met, qualifies the fresh query to be a candidate refinement query 304*a*. In another implementation, the minimum value of the CTR for fresh query relevance can be modified or the determination of the relevance of the fresh query can be omitted if the query was identified as a fresh query very recently (e.g., in the last 48 hours).

The number of search result selections for the fresh query is the aggregate number of selections of all search results, or a subset of search results, for the fresh query in a given time period (e.g., the last five days). If a fresh query has an aggregate number of selections above a threshold, the fresh query is selected as a candidate refinement query 304a. For example, selections of the top five ranked results in a fresh query result set may be considered as relevant selections.

The session-based data 312 also includes a number of users who refine any query to the fresh query under consideration. Users modify or "refine" their queries in a session in order to find more relevant search results. In general, a session is a period during which a user submits queries. A session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to a shared topic. In some implementations, a session is a period of time in which a user submits search queries related to the same topic or category.

Query refinements may be, but need not be, superstrings of the given query. A superstring contains all of the terms of another string and one or more additional terms. For example, the query refinements for the query "San Francisco" include "San Francisco Vacation" (a superstring of "San Francisco" because it includes "San Francisco" as well as the additional term "Vacation") and "Golden Gate Bridge" (not a superstring of "San Francisco" because it does not include the phrase "San Francisco"). In some implementations, a query refinement does not contain all of the terms of the original query, but is considered to be a refinement based on a "nearness" score determined by a term-weighted edit distance between the terms of the original query and the refinement. (By term weighting, we mean that the edit distance algorithm would be aware of synonyms, stop words, and so on, when computing term distance between the two queries.) For example, the query "San Francisco Hotels" is near the query "San Francisco Beaches".

In addition to session-based data 312, the query filter component 304 can utilize corpus-based data 310. The corpus-based data 310 that can be considered for a given fresh query comprises whether the results of the fresh query are "fresh" enough and whether a sufficient number of news results (e.g., news articles or recently generated web content) are shown on the results page for the fresh query. Determination of whether a fresh query is "fresh" enough to be considered a candidate refinement query 304a is based on how many times the query occurs in the search logs 1064 in a recent time period, for example. By way of illustration, a query is "fresh" if the query has had more than 25,000 impressions since midnight of the previous day and which at one point in the last seven days exceeded its prediction model by three times the standard deviation. Or, by way of further illustration, the query was issued more than five times in a recent hour. Other techniques for determining if a query is fresh are possible. In a further implementation, a fresh query is considered "fresh" enough based on how fast the query became popular (e.g., a query's counts have grown by a factor of ten within the last two hours)

The presence of news results in web search results for a fresh query may be an indication that the query is actually related to recent news. In some implementations, the sufficient number of news results in response to a web search on a fresh query is a tunable threshold that can be determined by the number of news results in the fresh query's search results compared to the total number of results satisfying a criterion (e.g., 50% of fresh query results are news results or at least k new results are within the top N results). In a further implementation, the criterion is that, for at least 10% of the time, the result set or the highest ranked N results in response to the fresh query includes multiple news results or the results for the query includes at least one news result on the first page of the results.

In various implementations, sanity checks can also be applied to the fresh queries 302a under consideration to eliminate those that result from click spam or have poor web search results. For example, if a given fresh query is associated with a small number of IP addresses in the search logs 1064 (that is, the fresh query was submitted by a small number of clients), the fresh query is considered potential click spam and not selected as a candidate refinement query 304a. If a fresh query originates from a news source property (e.g., appears in the news search logs 1064a) and does not have a sufficient number of "good" web search results (e.g., at least one web result that is not a news result where the web result is of high quality result as determined based on words in the result), the fresh query is not selected. By way of illustration, a fresh query can be selected when the fresh query has a 30% CTR on web search results for a minimum of 50 web impressions. In another example, a query from news source property that has news results in response to a web search on the query may be filtered in by the query filter component 310. For example, if there is a sufficient number of news results that are responsive to the user's query, the fresh query can be suppressed so as not to show redundant information to the user.

A matching component 306 receives a user submitted query 314 (e.g., 1010b) from the search engine 1030 or another component and an optional user source selection 316. The matching component 306 selects, among the candidate refinement queries 304a, the queries that match the query 314. In various implementations, a matched candidate refinement query is a superstring of the user submitted query 314, or the matched candidate refinement query is a refinement of the user submitted query 314. In some implementations, the number of users who refined the query 106 to the matched query satisfies a threshold that is count of distinct users. The number of users can also be a fraction of users relative to a number of users who submitted the user query 314 (e.g., 35% of users).

In further implementations, the matching component 306 receives a source restriction 316 for the candidate refinement queries 304a which eliminates from consideration those refinement queries 304a that do not originate from the specified source (e.g., news search logs 1064a, blog search logs 1064b, and so on).

The ranking component 308 receives the matched candidate refinement queries 318 and ranks them according to one or more of the techniques described in TABLE 1 below. The resulting ranked refinement queries 320 are provided to the search engine 1030 for inclusion in the search results 1028a.

TABLE 1

| RANKING TECHNIQUE | DESCRIPTION |
| --- | --- |
| Number of News Results | Ranking can be based on the number of news results included in the search results for each matched query 318. |
| CTR of News Results | Ranking can be based on the CTR on news/blog results for the each matched query 318. |
| Source Criterion | Ranking can be based on a criterion that is particular to the source of the matched query 318. For example, if the source of the matched query 318 is a news search logs, the criterion can be the number of news clicks or the news CTR. |

TABLE 1-continued

| RANKING TECHNIQUE | DESCRIPTION |
|---|---|
| Freshness of Matched Query | Ranking can be based on number of times during a recent time period that each matched query 318 was submitted as a search query to a search engine. |
| Quality of Results | Ranking can be based on the quality of results associated for the matched queries 318 as derived from click data. |
| User Profile | Ranking can be personalized based on a user's search history on news properties as well as web search properties. The search history can be analyzed to determine the user's interests. Matched candidate refinement queries can be promoted in rank or demoted based on how well the queries results match the user's interests. For example, if there are two candidate fresh queries but one matches the topics in a user's search history, while the other does not, then the former may be ranked higher than the later for the user. |

In further implementations, the ranking component 308 can remove or rank lower matched refinement queries 318 that have less than 50% (or some other percentage) of their search results that differ from the results for the user submitted query 314. In yet further implementations, the ranking component 308 can rank the matched refinement queries 318 based on popularity of the matched refinement queries over a given time period (e.g., last five days).

Figure 4:
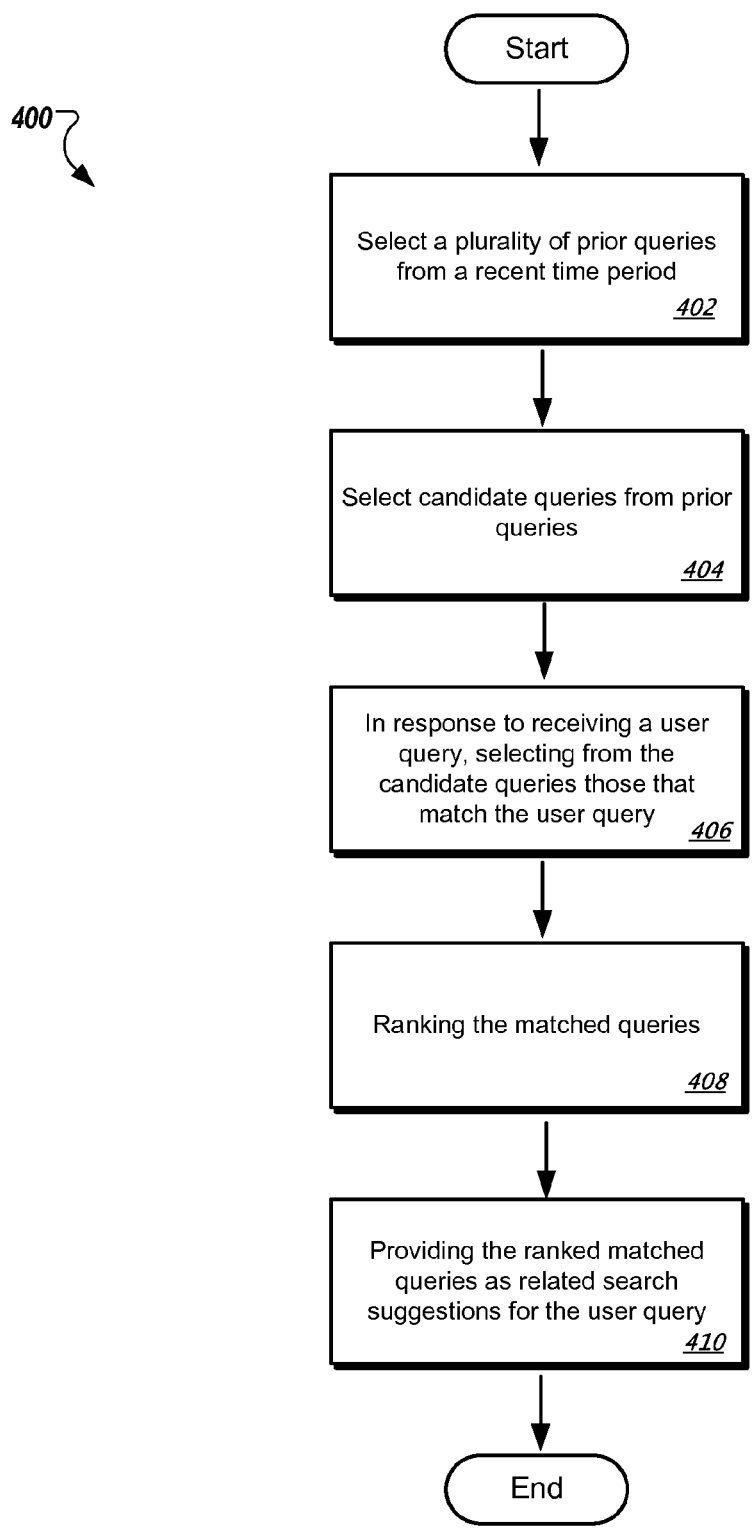
FIG. 4 is a flow chart of an example technique for providing fresh related search suggestions in response to a user submitted query.

FIG. 4 is a flow chart describing a technique 400 for providing fresh related search suggestions in response to a user submitted search query. The technique will be described in reference to a system, e.g., a server system (e.g. 1014) that performs the technique 400. A number of previously submitted queries (e.g., 302a) are selected from various sources such as search logs 1064a-f (step 402). For example, the selection of each of these queries is based on a number of times the query was submitted to a search engine during a given time period. Candidate queries (e.g., 304a) are then selected from the prior queries based on session-based data (e.g., 312) and/or corpus-based data (e.g., 310), as described above (step 404). In response to receiving a user query (e.g., 1010b), candidate queries are selected that match the user query (step 406). Each matched query is a superstring of the user query, a refinement of the user query, or both, for example. The matched queries (e.g., 318) are then ranked according to various techniques (step 408) and provided as related search suggestions (e.g., 320) in response to the user query (step 410).

Figure 5:
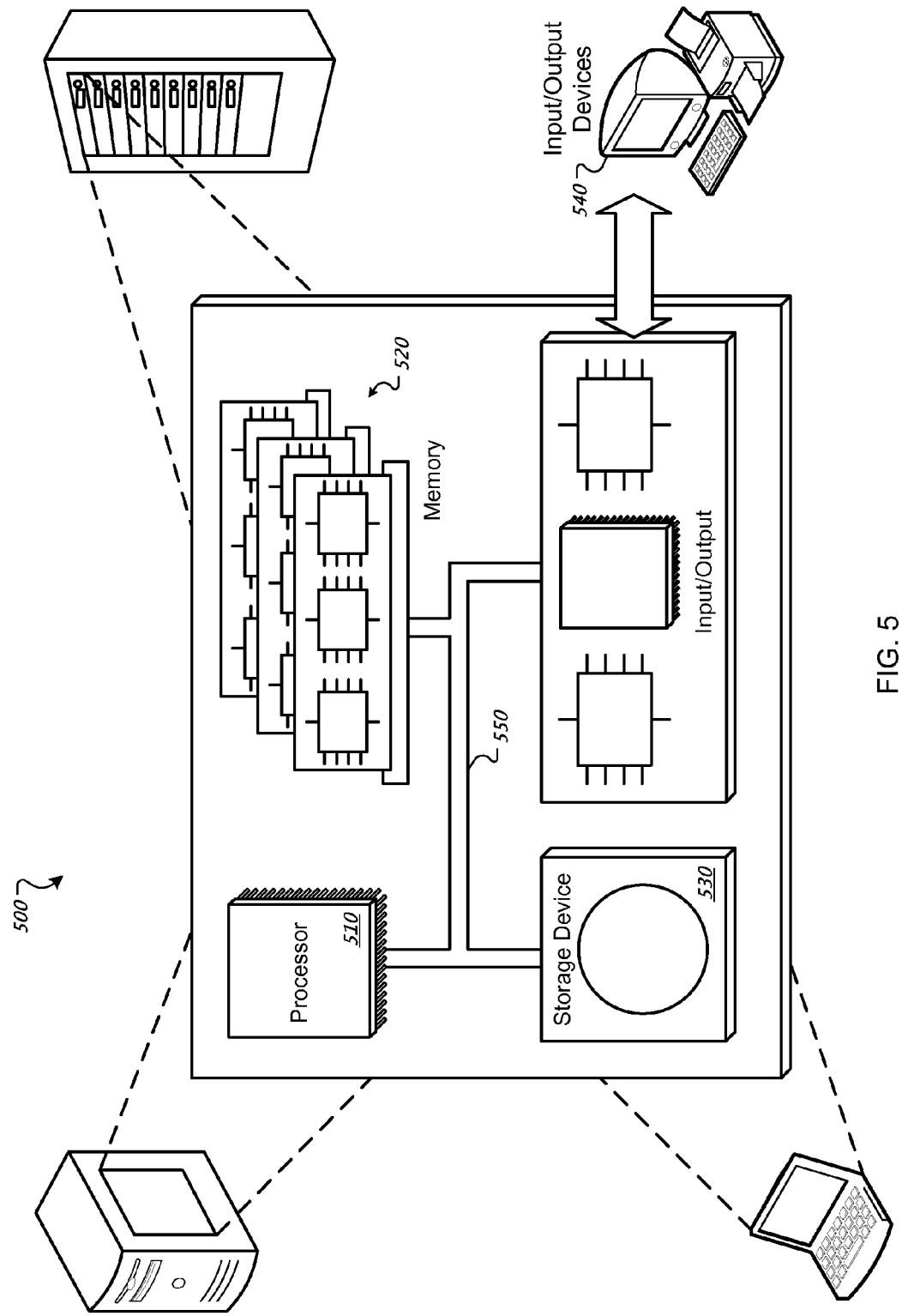
FIG. 5 is a schematic diagram of an example computer system.

FIG. 5 is a schematic diagram of an example computer system 500. The system 500 can be used for implementing software components and techniques as described above. The system 500 can include a processor 510, a memory 520, a storage device 530, and input/output devices 540. Each of the components 510, 520, 530, and 540 are interconnected using a system bus 550. The processor 510 is capable of processing instructions within the system 500. These instructions can implement one or more aspects of the systems, components and techniques described above. In some implementations, the processor 510 is a single or multi-threaded processor with one or more cores and is capable of processing instructions stored in the memory 520 or on the storage device 530 to display graphical information for a user interface on the input/output device 540.

The memory 520 is a computer readable medium such as volatile or non volatile that stores information within the system 500. The memory 520 can store processes related to the functionality of the search engine 1030, for example. The storage device 530 is capable of providing persistent storage for the system 500. The storage device 530 can include a floppy disk device, a hard disk device, an optical disk device, or a tape device, or other suitable persistent storage mediums. The storage device 530 can store the various databases described above. The input/output device 540 provides input/output operations for the system 500. The input/output device 540 can include a keyboard, a pointing device, and a display unit for displaying graphical user interfaces.

The computer system shown in FIG. 5 is but one example. In general, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more components of computer program instructions encoded on a computer readable medium for execution by, or to control the operation of one or more data processing apparatus.

The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a component, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more components, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject of matter, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance installed in an enterprise network.

What is claimed is:

1. A method comprising:
   periodically analyzing one or more data sources to identify a plurality of prior queries as fresh queries, wherein each of the prior queries was submitted as a search query a number of times during a recent time period and satisfies a criterion, wherein the criterion is a rate of change in query frequency during the time period, a deviation from an expected query frequency during the time period, or a threshold number of occurrences of the query during the time period;
   filtering the fresh queries to determine candidate refinement queries;
   in response to receiving a user query from a user, selecting from the candidate refinement queries a plurality of queries that match the user query;
   ranking the selected plurality of queries, wherein the selected plurality of queries are ranked based on one or more of the data source of each selected query, a quality of results associated with each of the selected queries, or a profile of the user; and
   providing one or more of the selected queries as related search suggestions for the user query based on the ranking.

2. The method of claim 1, wherein filtering the fresh queries comprises:
   determining whether each fresh query is associated with an aggregate number of search result selections above a threshold value.

3. The method of claim 1, wherein filtering the fresh queries comprises:
   determining whether each fresh query is associated with an aggregate click through rate for search result selections for the fresh query that satisfies a threshold value.

4. The method of claim 1, wherein filtering the fresh queries comprises:
   determining whether each fresh query is associated with a threshold number of users who refine a query into the fresh query.

5. The method of claim 1, wherein filtering the fresh queries comprises:

determining whether each fresh query is associated with a number of IP addresses in the data sources fewer than a threshold number.

6. The method of claim 1, wherein filtering the fresh queries comprises:
filtering the fresh queries based on the one or more data sources.

7. The method of claim 1, wherein the selected queries are further ranked based on a number of times during the recent time period that the selected queries were respectively submitted as a search query.

8. The method of claim 1, wherein the one or more data sources include one or more of news search logs, blog search logs, web search logs, image search logs, video search logs, or trend logs.

9. A method comprising:
periodically analyzing one or more data sources to identify a plurality of prior queries as fresh queries, wherein each of the prior queries was submitted as a search query a number of times during a recent time period and satisfies a criterion, wherein the criterion is a rate of change in query frequency during the time period, a deviation from an expected query frequency during the time period, or a threshold number of occurrences of the query during the time period;
in response to receiving a user query from a user, selecting from the fresh queries a plurality of queries that match the user query;
ranking the selected plurality of queries, wherein the selected plurality of queries are ranked based on one or more of the data source of each selected query, a quality of results associated with each of the selected queries, or a profile of the user; and
providing one or more of the selected queries as related search suggestions for the user query based on the ranking.

10. The method of claim 9, wherein the one or more data sources include one or more of news search logs, blog search logs, web search logs, image search logs, video search logs, or trend logs.

11. The method of claim 9, wherein the one or more data sources include one or more of micro blogs, mini blogs, book-marking sites, or real-time services.

12. The method of claim 9, wherein the fresh queries comprise a filtered set of the plurality of prior queries, wherein the prior queries are filtered according to one or more criteria.

13. The method of claim 9, comprising filtering the plurality of prior queries wherein the filtering includes determining, for each of the prior queries, whether a total number of search results responsive to the prior query include a threshold number of news results.

14. The method of claim 9, comprising filtering the plurality of prior queries, wherein the filtering includes determining whether each prior query is associated with an aggregate number of search result selections above a threshold value.

15. The method of claim 9, comprising filtering the plurality of prior queries wherein filtering the prior queries includes determining whether each prior query is associated with an aggregate click through rate for search result selections for the prior query that satisfies a threshold value.

16. The method of claim 9, comprising filtering the plurality of prior queries wherein filtering the prior queries includes determining whether each prior query is associated with a threshold number of users who refine a query into the prior query.

17. The method of claim 9, comprising filtering the plurality of prior queries wherein filtering the prior queries includes filtering the prior queries based on the one or more data sources.

18. A system comprising:
one or more computers configured to perform operations comprising:
periodically analyzing one or more data sources to identify a plurality of prior queries as fresh queries, wherein each of the prior queries was submitted as a search query a number of times during a recent time period and satisfies a criterion, wherein the criterion is a rate of change in query frequency during the time period, a deviation from an expected query frequency during the time period, or a threshold number of occurrences of the query during the time period;
filtering the fresh queries to determine candidate refinement queries;
in response to receiving a user query from a user, selecting from the candidate refinement queries a plurality of queries that match the user query
ranking the selected plurality of queries, wherein the selected plurality of queries are ranked based on one or more of the data source of each selected query, a quality of results associated with each of the selected queries, or a profile of the user; and
providing one or more of the selected queries as related search suggestions for the user query based on the ranking.

\* \* \* \* \*